July 21, 1959
E. R. BERSEY
2,895,832
NOVELTY CAKE AND METHOD OF PRODUCING THE SAME
Filed May 2, 1958
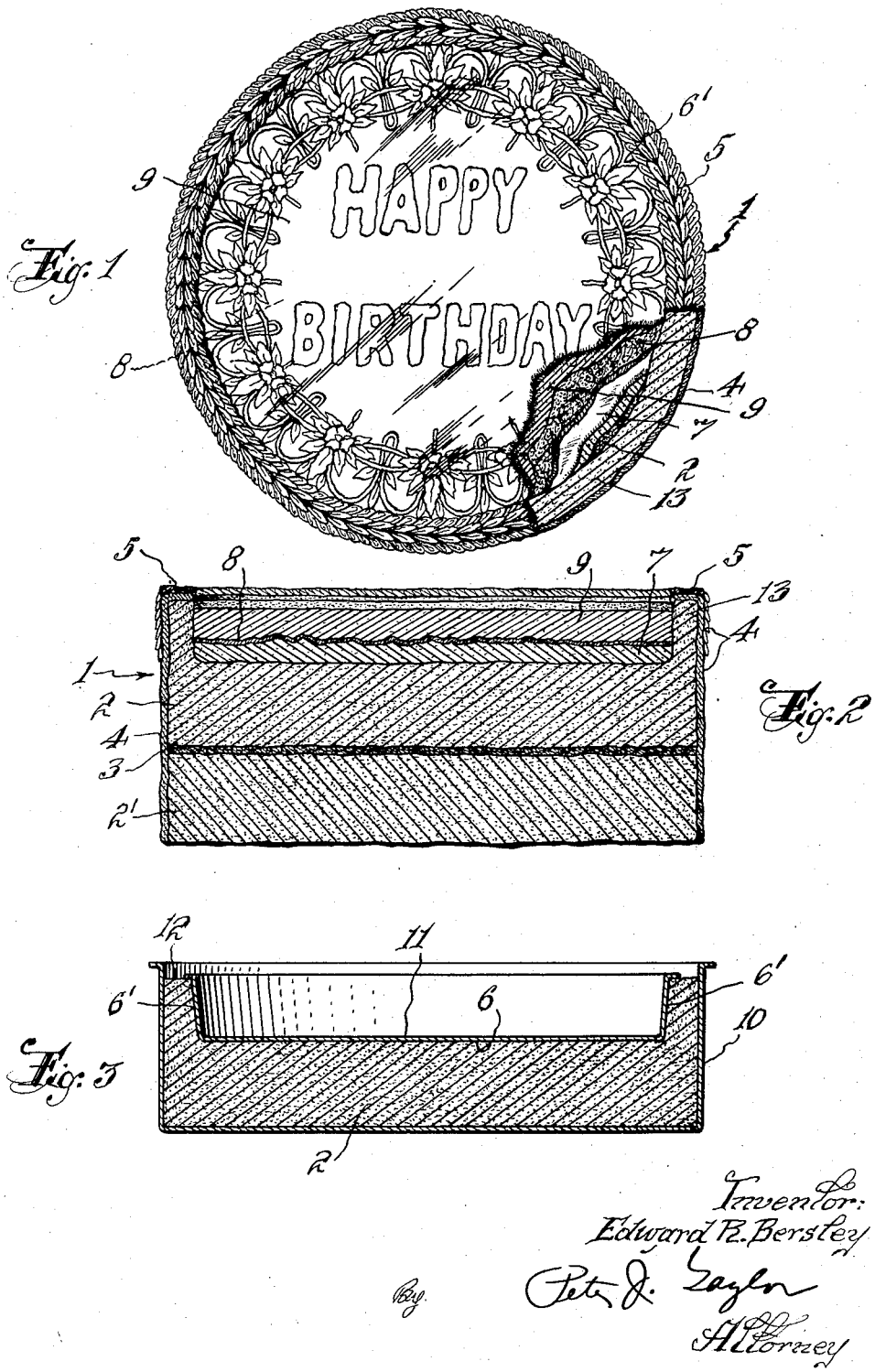
Inventor:
Edward R. Bersley
By Peter J. Taylor
Attorney

United States Patent Office 2,895,832
Patented July 21, 1959

2,895,832

NOVELTY CAKE AND METHOD OF PRODUCING THE SAME

Edward R. Bersey, Iselin, N.J.

Application May 2, 1958, Serial No. 732,519

4 Claims. (Cl. 99—92)

This invention deals with a novelty cake which would be appropriate in celebrating special occasions, such as birthdays, holidays, christenings, weddings, and the like. More specifically, it relates to a cake having a recess in its upper surface wherein is imbedded a suitable edible design in a transparent gelatin.

Cakes have been prepared in the past with icing designs covering the surface and suitable for celebrating special occasions or holidays. Such designs are usually made of icing such as that containing butter and sugar plus vegetable coloring. Designs of this type have also incorporated jelly or gelatin pieces on the surface making up a portion of the design.

This invention deals with an edible design submerged in transparent gelatin disposed in a recess or well in the top of the cake. The invention will be more readily understood by reference to the accompanying drawing in which a preferred embodiment is depicted, and in which Figure 1 illustrates a top view of a prepared embodiment of a cake prepared in accordance with the present invention. Figure 2 presents a cross-sectional side view of the cake shown in Figure 1, while Figure 3 depicts a cross-sectional side view of a cake in a pan to illustrate one manner of forming the recess in the top of the cake. Similar numerals refer to similar parts in the various figures.

Referring again to the drawing, numeral 1 represents a cake prepared in accordance with this invention and made of any conventional cake batter. Such a cake may be a single layer as in Figure 3, or a double layer, as in Figure 2, wherein the two layers 2 and 2' are separated by a thin layer 3 of jelly, icing or similar material. The upper surface on top of the cake is provided with a recess or well about an inch in depth and having bottom 6 and sides 6'. In this recess is poured a layer 7 of transparent edible gelatin which is preferably cooled to near the solidification point prior to pouring into the recess 6 of cooled cake 1. In an ordinary size cake, this layer would require one package of gelatin and would be in the neighborhood of ¼" to ½" thick. After boiling, it is preferably cooled with ice cubes until it is almost set, when it is poured into the recess. The cake then is preferably inserted in a refrigerator and cooled to harden further this layer of gelatin.

Thereafter, the cake is removed from the refrigerator and an edible sheet bearing the outline of the desired design is placed over the gelatin layer and allowed to become wet and to settle on the surface until it becomes clear and transparent. These edible sheets are available on the market, and they generally are prepared from potato flour and water. They have a thickness of a thick sheet of paper. The outline of the design may be imprinted thereon in certified colors as a guide for the baker to apply her own coloring, although such a sheet with an already-colored design may be furnished ready to place on the cake. It has been found that ordinary colored icing is unsuitable for the coloring of the design since it dissolves in the gelatin and diffuses thereinto. A suitable material for the design can be prepared by mixing approximately ⅔ cream cheese with ⅓ piping gel (a mixture of agar-agar and corn syrup), with the desired certified color added. This coloring then may be squeezed through a pastry icing dispensing bag, following the imprinted design, so that a complete edible picture is provided onto the edible sheet. For example, for a birthday, a floral design 13 may be painted onto the sheet 8. For St. Patrick's Day, a shamrock and pipe would be suitable, using a light green or multi-colored transparent gelatin, etc.

After the picture or design 13 is colored by application of the special coloring, the cake is again placed in the refrigerator for about 15 minutes to harden the coloring. Thereafter, the cake is removed from the refrigerator and another layer of transparent gelatin is poured into recess 6 over sheet 8 for a distance of about ¼" to ½", and icing 4 and other decorations 5 may be applied at this time prior to again inserting the cake into the refrigerator to facilitate hardening of the gelatin.

It is apparent from the foregoing that there is produced, by this means, a cake which, when viewed from the top, has a visible design submerged in a pool of transparent gelatin, creating a novel, unique, and pleasing effect, and also providing a delicious combination dessert of cake and gelatin.

Although recess 6 may be cut out of an already-baked cake, it is easily formed by baking the cake with a raised central bottom portion (so as to give the desired recess when the cake is reversed), in which case the bottom portion may be in the shape of a heart, bell, or the like or by placing a pan 11 over the batter 2 in the cake pan 10, as in Figure 3. The batter is filled around the outside of pan 11 to provide the cake sides 12 which form recess sides 6' after pan 11 is removed when the cake is baked.

In marketing the unbaked cake ingredients, it is desirable to provide a kit containing the coloring for the sheet in a sealed bag or tube having a nozzle, the end of which may be snipped off to enable squeezing out of the ingredients after the cake is baked. Such coloring may have added to it a preservative to extend the useful life thereof. Also, the first layer of gelatin may be dispensed with, although it has been found that its presence facilitates greatly the smoothing out of the edible sheet and provides a much more legible and even design visible through the second layer of gelatin. Furthermore, the side 6' and the well may be coated with a white layer of icing or coloring so as to reflect the light and thus increase visibility of the design. In fact, provision may be made by means of a special insert in the cake to supply electrical lighting under the edible sheet carrying the design and thus provide additional novelty effects.

I claim:

1. A novelty cake comprising a baked cake having a recess in its upper surface, an edible sheet bearing an edible design applied on the surface of said sheet disposed in said recess, and a layer of transparent gelatin disposed over said sheet and filling most of the recess in said cake.

2. A novelty cake comprising a baked cake having a recess in its upper surface, a layer of gelatin partially filling said recess, an edible sheet bearing an edible design applied on the surface of said sheet, said sheet being disposed over said layer of gelatin, and a second layer of transparent gelatin disposed over said sheet and filling most of the recess in said cake.

3. A novelty cake according to claim 1 in which the edible design comprises roughly two-thirds cream cheese and one-third piping gel.

4. A method of producing a novelty cake comprising making a recess in the upper surface of said cake, pouring thereinto a cooled hardenable solution of gelatin, then cooling the cake to further harden the gelatin, applying to the surface of the gelatin layer an edible sheet bearing an edible design, again cooling the cake to harden the design, pouring over said sheet a cooled second layer of transparent hardenable gelatin, and cooling the cake to provide a transparent top through which is visible the design.

References Cited in the file of this patent

UNITED STATES PATENTS

| | | |
|---|---|---|
| 1,852,966 | Green | Apr. 5, 1932 |
| 2,394,322 | McKee | Feb. 5, 1946 |

OTHER REFERENCES

"Modern Encyclopedia of Cooking," 1949, by M. Givens, published by J. G. Ferguson & Assoc. (Chicago), vol. 1, pp. 721 and 722.